United States Patent
D'Agosto, III

(10) Patent No.: US 6,314,331 B1
(45) Date of Patent: *Nov. 6, 2001

(54) ENHANCED USER CONTROL OPERATIONS FOR SOUND RECORDING SYSTEM

(75) Inventor: Nicholas A. D'Agosto, III, Trumbull, CT (US)

(73) Assignee: Dictaphone Corporation, Stratford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/317,355

(22) Filed: May 24, 1999

Related U.S. Application Data

(63) Continuation-in-part of application No. 09/224,518, filed on Dec. 31, 1998
(60) Provisional application No. 60/078,330, filed on Mar. 17, 1998.

(51) Int. Cl.$^7$ ........................................ G06F 17/00
(52) U.S. Cl. .............................. 700/94; 381/91; 360/137; 360/69
(58) Field of Search .................................. 700/94; 381/94; 704/272, 270, 278; 369/25, 27; 360/137, 69–70, 73.04, 73.08, 71–72.3, 74.1–75, 81–96.6; 40/124

(56) References Cited

U.S. PATENT DOCUMENTS

| | | | |
|---|---|---|---|
| 4,050,088 | * 9/1977 | Okuda | 360/137 |
| 4,213,583 | * 7/1980 | Mitani et al. | 360/137 |
| 4,686,587 | * 8/1987 | Hipp et al. | 360/74.2 |
| 4,817,127 | * 3/1989 | Chamberlin et al. | 369/27 |
| 5,245,694 | * 9/1993 | Zwern | 395/2 |
| 5,491,774 | * 2/1996 | Norris et al. | 369/29 |
| 5,542,103 | 7/1996 | Mottier et al. | 455/89 |
| 5,548,832 | 8/1996 | Karam | 455/226.4 |
| 5,583,382 | 12/1996 | Wagner | 307/10.1 |
| 5,689,802 | 11/1997 | Luzzatto | 455/11.1 |
| 5,828,730 | * 10/1998 | Zebryk et al. | 369/27 |
| 5,841,979 | * 11/1998 | Schulhof et al. | 395/200.67 |
| 5,842,170 | * 11/1998 | Daberko et al. | 704/278 |
| 6,031,915 | * 2/2000 | Okano et al. | 381/56 |

* cited by examiner

Primary Examiner—Forester W. Isen
Assistant Examiner—Laura A. Grier
(74) Attorney, Agent, or Firm—Kramer Levin Naftalis & Frankel LLP; Gregor N. Neff

(57) ABSTRACT

A sound recording system includes a hand microphone with a plurality of operation switches mounted on the hand microphone. The switches include a record switch. The system also includes a sound recording device which is connected by a signal path to the hand microphone and records sound information generated at the hand microphone. Control circuitry included in the hand microphone and/or in the sound recording device controls operation of the sound recording device on the basis of input signals generated by the user via the operating switch array. If the record switch is actuated for only a brief period of time, a record-lock mode of operation is implemented. If the record switch is actuated for a longer period of time, a momentary-record mode is entered which lasts only as long as the record switch remains in an actuated position.

10 Claims, 6 Drawing Sheets

HAND MIC. ELECTRONICS

US 6,314,331 B1

ENHANCED USER CONTROL OPERATIONS FOR SOUND RECORDING SYSTEM

REFERENCE TO RELATED APPLICATION

This is a continuation-in-part of prior patent application Ser. No. 09/224,518, filed Dec. 31, 1998, which is a continuation in part of provisional patent application serial No. 60/078,330, filed Mar. 17, 1998. The disclosure of application Ser. No. 224,518 is incorporated herein by reference.

BACKGROUND OF THE INVENTION

This invention relates to sound recording devices.

There are available in the market a variety of different kinds of sound recording devices intended for use in offices, medical facilities and so forth. For example, compact portable recorders which record voice signals on a tape cassette or a removable solid state memory card are in wide-spread use. Desk-top recorders are also widely used. Typical desk-top recorders include a desk-top unit which includes a tape-cassette deck or a receptacle for a memory card, and a hand microphone which is connected to the desk-top unit by a cord or cable.

It is also known to employ central dictation systems of the type in which the recording medium (such as a magnetic tape or a computer hard disk) is housed in a central recording unit that is located remotely from users of the system. Dictation terminals including a handset are provided at the user locations and are connected to the central recording unit by telephone or dedicated communication lines.

It is customary that portable recorders, hand microphones and dictation terminal handsets include, in addition to a microphone, a number of manually operable switches which permit the user to control basic functions such as record, stop, play, rewind and fast forward. It would be desirable to increase the number of functions controlled through the user interface, but without increasing the number of control switches, since increasing the number of switches is likely to increase the size and manufacturing cost of the portable recorder, hand microphone, or dictation terminal.

OBJECTS AND SUMMARY OF THE INVENTION

It is an object of the invention to provide a portable sound recording system in which a user may access more than one type of recording function by actuating only a single record button.

A sound recording system provided in accordance with the invention includes a hand microphone, a plurality of operating switches mounted on the hand microphone and including a record switch, a sound recording device for recording sound information generated at the hand microphone, circuitry for providing a signal path between the hand microphone and the sound recording device, and a control circuit for controlling operation of the sound recording device. The response provided by the control circuitry to actuation of the record switch depends on the length of the period of time during which the record switch is maintained in an actuated position. If the record switch is placed in an actuated position for only a brief period of time (say, less than one second) the control switch changes the recording device over from a stop mode to a record mode. That is, if the recording device is in the stop mode at the time that the brief actuation of the record switch occurs, then the recording device is placed into the record mode, and the record mode is maintained indefinitely. On the other hand, if the record switch is maintained in an actuated position for an extended period of time, say, one second or more, then the recording device is maintained in the record mode, and the record mode continues, only so long as the record switch is maintained in the actuated position.

The present invention permits a record-lock function to be added to a sound recording system without adding another control switch or a further control position to an existing switch. Moreover, the user's selection between record-lock and controlled-duration recording modes is quite intuitive. If recording for an indefinite period is desired, the user actuates the record switch briefly and then takes no further action as recording continues. If the user wishes to actively control the duration of the recording mode, he or she simply keeps the record switch in its actuated position for as long as recording is desired. There is no requirement that the user be aware of what mode the recorder is in or that the user consciously navigate among various modes. In effect, the recorder adapts itself to the user's desired mode of operation.

The foregoing, and other objects, features and advantages of the invention will be further understood from the following detailed description of preferred embodiments and from the drawings, wherein like reference numerals identify like components and parts throughout.

DESCRIPTION OF PREFERRED EMBODIMENTS

Figure 1:
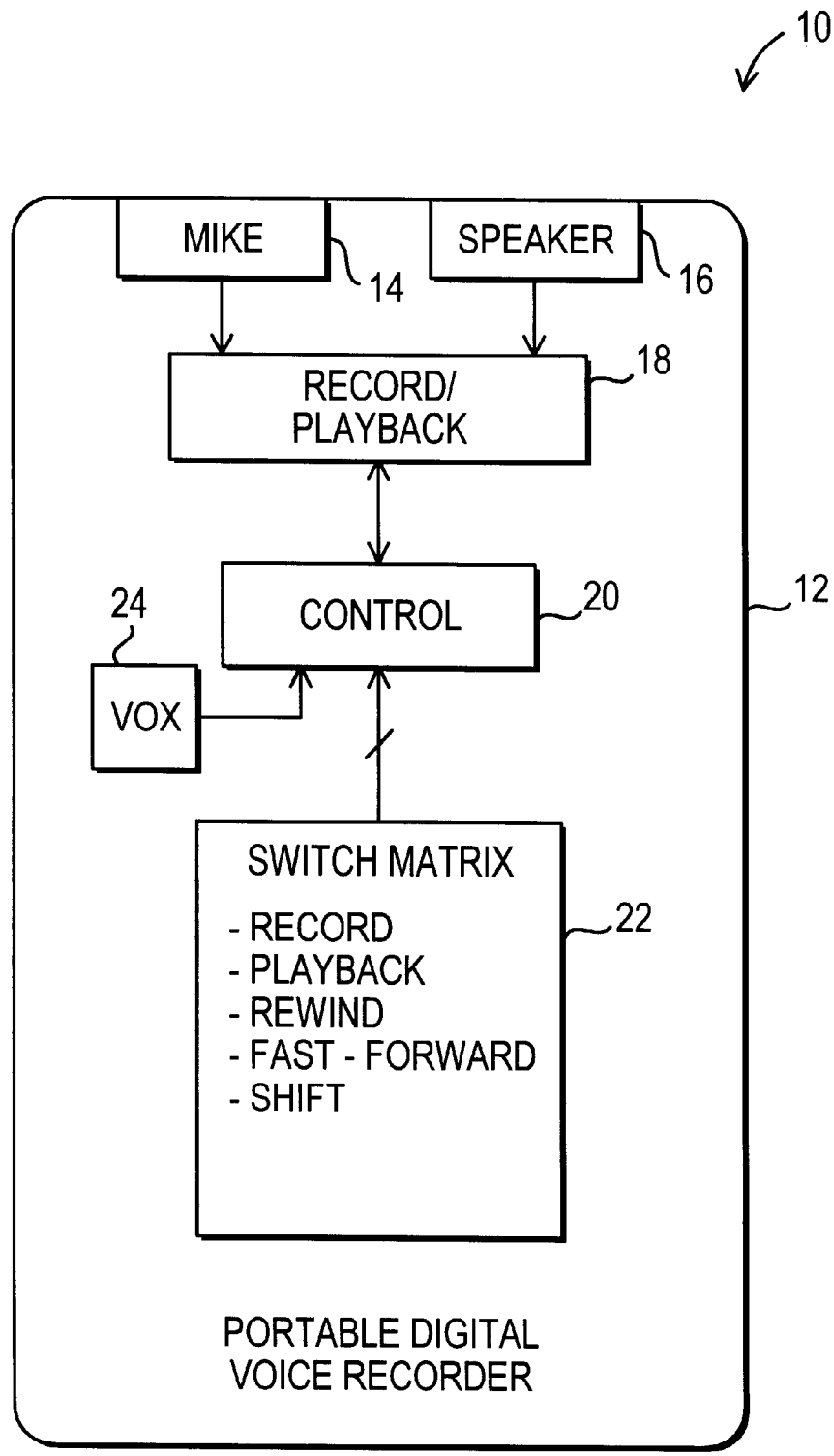
FIG. 1 is a schematic block diagram of a portable voice recorder in which the present invention is applied.

FIG. 1 schematically illustrates a portable digital voice recorder 10 in which the present invention is applied. The recorder 10 includes a housing which is schematically indicated at reference numeral 12. Preferably the housing 12 is shaped and sized to be held in the palm of the operator's hand.

A microphone 14 and speaker 16 are within the housing 12. A record/playback circuit 18 receives electrical sound signals generated at the microphone 14 and records such signals on a recording medium (not separately shown). The recording medium may be, for example, a standard removable solid state memory card or a magnetic tape cassette. If digital recording is to be carried out in the recorder 10, as is the case when the recording medium is a solid state memory card, the record/playback circuit 18 includes analog-to-digital conversion circuitry. In this case the record/playback circuit 18 also may include data compression/decompression circuitry.

The record/playback circuit 18 is operable to reproduce a stored sound signal from the recording medium and to process the reproduced signal so as to provide an output signal suitable for driving the speaker 16.

A control circuit 20 is connected to exchange signals with the record/playback circuit 18. The control circuit 20 controls operation of the record/playback circuit 18 and of the recorder 10 in general. The control circuit 20 may be constituted by a microprocessor or microcontroller, and should also be understood to include program memory and working memory, which are not separately shown. The control circuit 20 may also be constituted by an ASIC (application specific integrated circuit).

The recorder 10 also includes a set of operating switches 22 which are actuatable by the user to provide input to the control circuit 20. As indicated in FIG. 1, the switch matrix 22 may include switch keys for actuating a number of functions including Record, Playback, Rewind, Fast-Forward and Shift. It is to be understood that some of these keys may be omitted, and/or that additional keys may be provided.

The switch keys in the switch matrix 22 each operate a respective switch which is movable between a first position (non-actuated) and a second position (actuated). In a preferred embodiment of the invention, some or all of the switches, including the record switch, are biased toward the first (non-actuated) position. It is contemplated that some of the switches may be actuated by a shared key configuration, such as a rocker switch.

Figure 2:
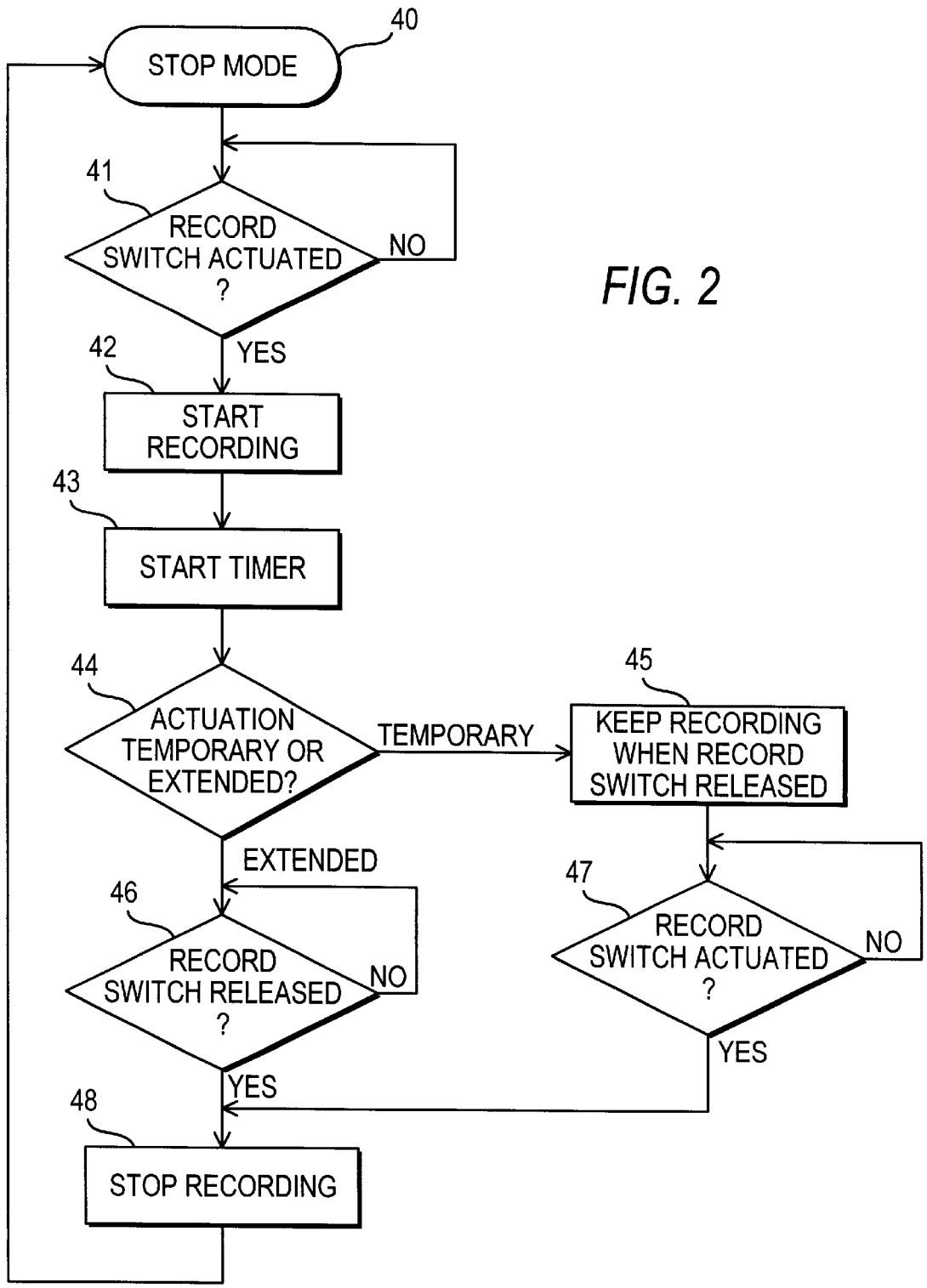
FIGS. 2 and 3 are flow charts which illustrate software which programs the control circuit of the recorder of FIG. 1 in accordance with the invention.

FIG. 2 illustrates in flow-chart form software which controls certain operations of the control circuit 20 in connection with reading the status of the switch matrix 22 and changing the operating mode of the recorder 10 on the basis of control signals input through the switch matrix 22.

For the purposes of FIG. 2, it is assumed that the recording control function is entered from stop mode, as indicated at block 40. (However, it is also contemplated that recording may be initiated when the recorder is in a mode other than stop mode.) It is then determined, as indicated at a decision block 41, whether the record switch has been placed in its actuated position. If not, the control flow idles (as indicated in FIG. 2), or alternatively proceeds to another portion of a control loop (not shown). If at step 41 it is found that the record switch has been placed in its actuated position, then the control flow proceeds to step 42, at which recording commences. Following step 42 is step 43, at which a timing function is commenced. Then, as indicated at step 44, it is determined whether the actuation of the record switch is "temporary" or "extended". That is, it is determined whether the timing function times out before the record switch is released. If not, then the actuation of the record switch is determined to be "temporary" (for example, less than one second in duration) and step 45 follows, at which it is established that recording will continue when the record switch is released. Accordingly, it will be recognized that a "temporary" actuation of the record switch leads to operation of the recorder 10 in a "recordlock" mode, in which recording continues without requiring the user to maintain the record switch in an actuated position.

If the actuation of the record switch is "extended" (one second or longer), then step 46 follows step 44. Step 46 is a decision block at which it is determined whether or not the record switch is released. If the record switch is not released, the process of FIG. 2 idles at step 46 and the recording mode continues. If the record switch is released, recording stops, as indicated at step 48, and the control flow returns to the stop mode (step 40). Actuation of the record switch for an "extended" period thus leads to operation in a "momentary-record" mode. In this mode, recording continues only for as long as the record switch is maintained in the actuated position.

Returning to block 45, which corresponds to the "record-lock" mode, a decision block 47 follows block 45. At block 47, it is determined whether the record switch has again been actuated. If not, the control loop idles in a recording mode. Otherwise, i.e. upon the next actuation of the record switch, block 48 is entered, so that recording ceases when the record switch is released and stop mode follows. It is contemplated, though not illustrated in FIG. 2, that actuation of switches other than the record switch may also cause the "record-lock" mode to be terminated.

It will be understood from the foregoing that the manner in which the control circuit 20 interprets and responds to actuation of the record switch varies according to the length of time that the record switch is maintained in its actuated position. The user may select either the record-lock function or the momentary-record function by operating a single switch which has only two positions—actuated or not actuated. There is no need to provide a separate record-lock switch or a mechanical lock for the record switch or a third operating position for the record switch.

The user interface provided by the present invention is also quite intuitive. If the user wishes to directly control the duration of the recording mode, he or she simply actuates the record switch for as long as recording is desired. If the user wishes to invoke the record-lock mode and then "forget about it", a brief actuation of the record switch suffices.

It is contemplated in accordance with the invention that the control circuit 20 will also vary its interpretation of, and response to, actuation of other switches, including the rewind and fast-forward switches, depending on the length of time that such switches are actuated. For example, if the rewind or fast-forward key is briefly actuated, the recorder is latched into a rewind or fast-forward mode that continues until the user again actuates the respective key (or another key such as a "stop" key, which is not shown). An extended actuation of the rewind or fast-forward key causes the respective function to be maintained until the key is released. In this case the operating mode is referred to as "momentary rewind" or "momentary fast-forward", as the case may be. It is also contemplated that extended actuation of either of these keys would cause the respective function to "accelerate" until the key is released.

As is well known to those who are skilled in the art, when a recorder is operated in a "VOX" mode, recording occurs if and only if sound energy at a given level or above is present at the microphone of the recorder. In a preferred embodiment of the invention, a signal lamp (not shown), such as an LED, is illuminated when the recorder is recording a sound signal. If the recorder is in the VOX mode, and recording is not taking place because no audible sound is present at the microphone, then the LED may be operated so as to flash to indicate that record mode is in effect but recording is not actually taking place. The VOX mode may be activated by a conventional method, such as entry of appropriate control signals during software setup, or by a two-position slide switch, indicated at 24 in FIG. 1. As will be understood by those who are skilled in the art, it may be quite desirable to select the VOX mode in conjunction with the record-lock mode in order to prevent recording of "dead air" in the record-lock mode.

Figure 3:
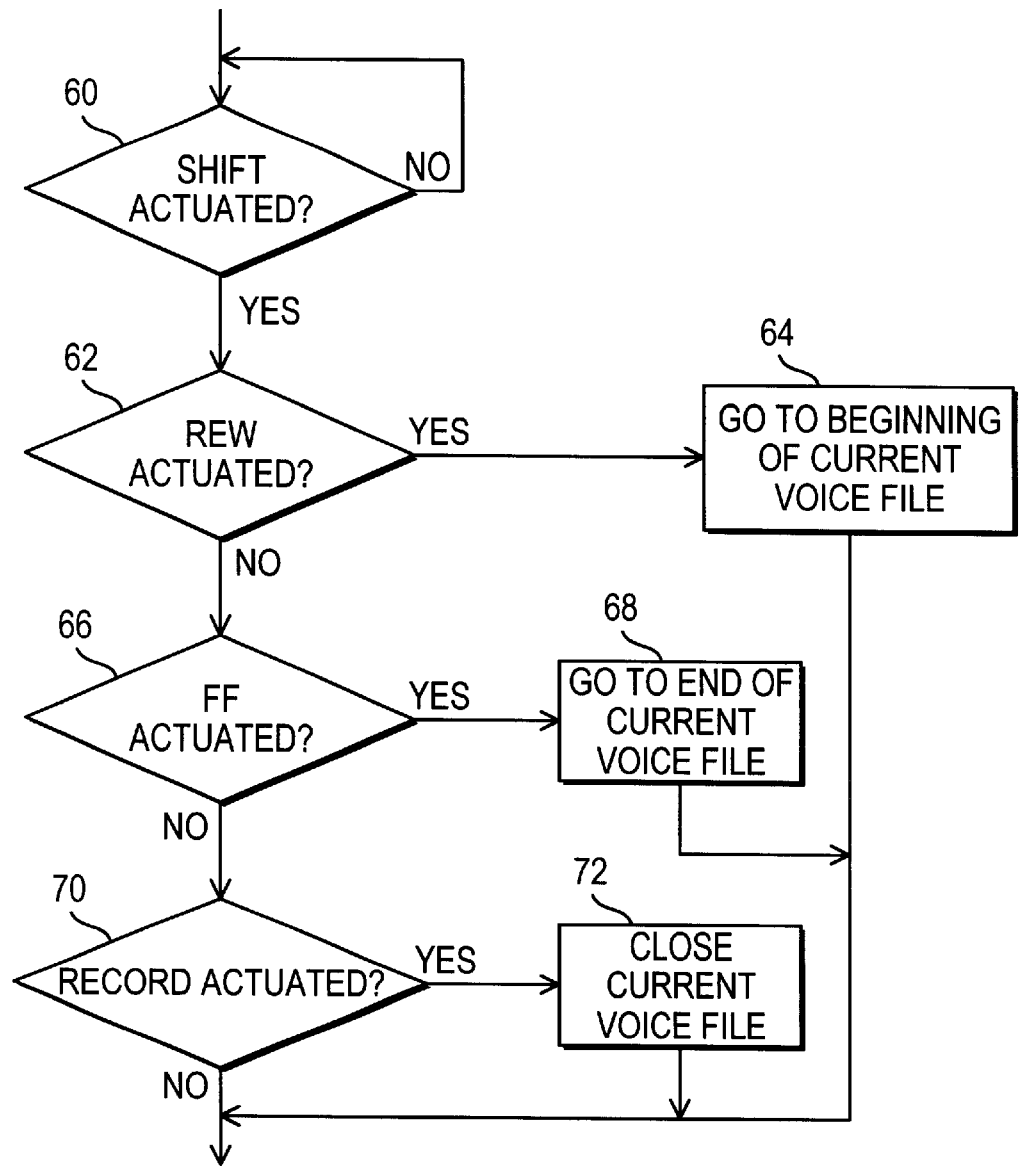

FIG. 3 illustrates additional software which is provided to control operation of the control circuit 20 in connection with interpretation of and response to control signals input by the user via the switch matrix 22. As indicated at step 60 in FIG. 3, it is determined whether the shift key is actuated. If not, the control flow idles (as indicated in FIG. 3), or alternatively proceeds to another portion of a control loop (not shown). If it is determined at step 60 that the shift key has been actuated, it is next determined whether the rewind key has been actuated (step 62). If so, the control circuit 20 shifts a pointer to the beginning of the currently accessed voice file (step 64). Playback from the beginning of the file then may occur automatically, or, according to an alternative embodiment of the invention, the recorder may idle, with recording or playback to occur at the beginning point of the voice file upon actuation of the record or playback keys, respectively.

If at step 62 the rewind key was not found to have been actuated, step 66 follows, at which it is determined whether the fast-forward key has been actuated. If so, the control circuit 20 shifts the software pointer to the end of the currently accessed voice file (step 68). The control circuit 20 may be programmed to automatically enter record mode with recording taking place at the end of the current voice file. Alternatively, the recorder may idle until the record key is actuated by the user, at which time an additional sound signal is recorded at the end of the current voice file. The user could also elect to rewind a short distance from the end of the file to review the last information recorded in the file.

If at step 66 it is not found that the fast-forward key has been actuated, step 70 follows, at which it is determined whether the record key has been actuated. If so, the control circuit 20 carries out a procedure for closing out the current voice file (step 72). Thus actuation of the record key together with the shift key invokes a "close file" function. If at step 70 it is not found that the record key has been actuated, the control loop proceeds forward, to await another key entry (not indicated in FIG. 3).

In the process shown in FIG. 3, the actuation of the shift key, and then the rewind key or the fast-forward key or the record key, may be sequential or concurrent. In the appended claims, actuating the rewind key or the fastforward key either sequentially after, or concurrently with, the shift key will be referred to as operating the respective key "in combination with" the shift key.

Although the portable digital voice recorder 10 shown in FIG. 1 may itself be considered to be a "sound recording system", it is further contemplated according to the invention that the processes described herein in connection with FIGS. 2 and 3 may also be applied to other types of sound recording systems, including those which encompass desk-top dictating machines, central dictation systems and personal-computer-based dictation systems. (By way of background, reference is made to co-pending application Ser. No. 09/099,501, which discloses a hand mic interfaced to a personal computer and used for recording voice signals in the personal computer. The personal computer is networked to other personal computers and transmits the recorded voice signals to one or more of the other personal computers to implement, for example, a central dictation system or a dictation system for a small work group. The '501 patent application is commonly assigned with the present application.)

An alternative type of sound recording system in which the invention may be applied, and featuring a hand microphone used to control a recording device separate from the hand microphone, will now be described with reference to FIGS. 4–6.

Figure 4:
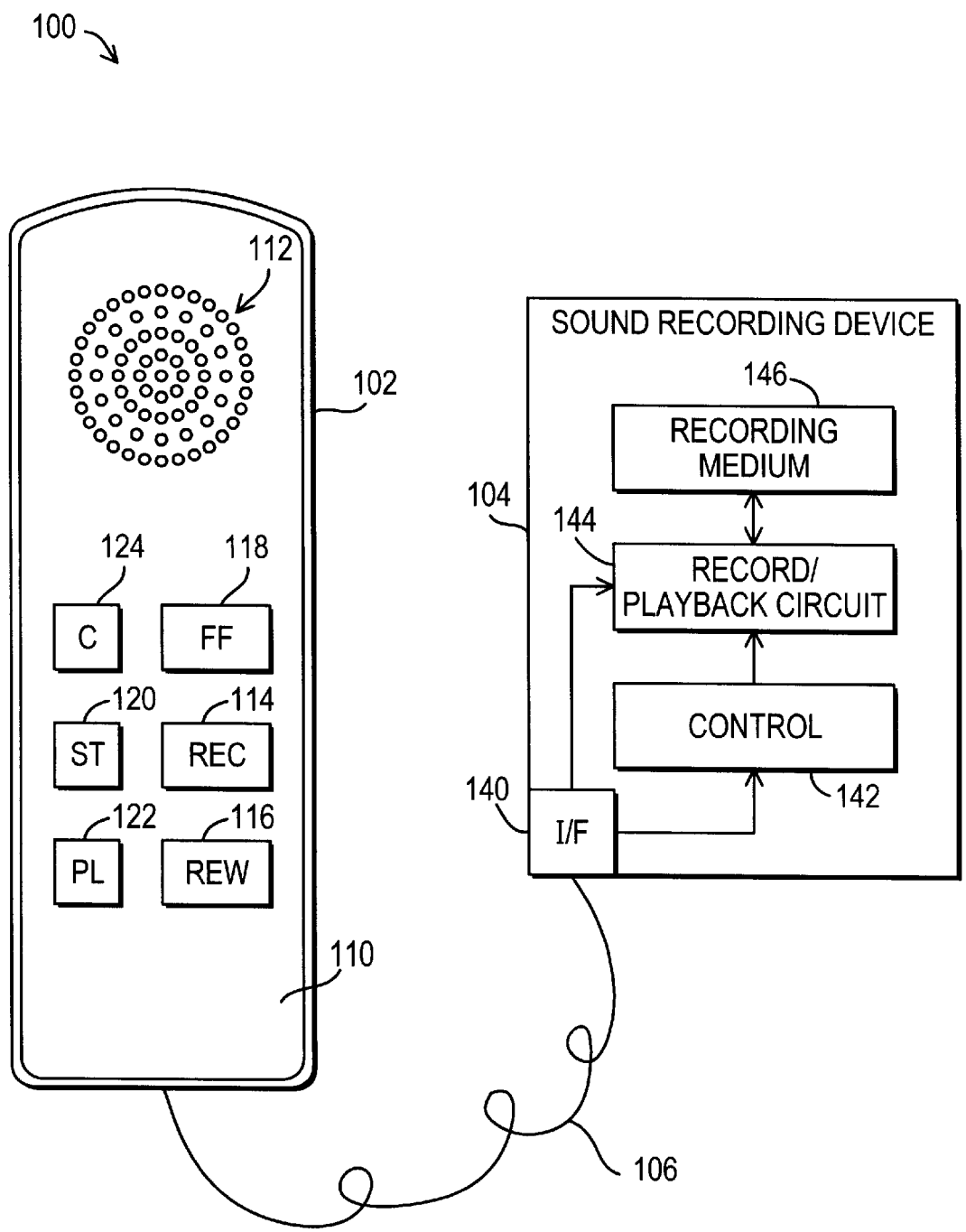
FIG. 4 schematically illustrates a sound recording system in which the present invention may be applied.

In FIG. 4 reference numeral 100 generally indicates a sound recording system, and reference numeral 102 indicates a hand microphone which the user may employ to input sound information and to control operation of the sound recording system. The rest of the sound recording system is constituted by a sound recording device 104 which is separate from the hand microphone 102, and a cord or cable 106 which interconnects the hand microphone 102 and the sound recording device 104. All of the hardware illustrated in FIG. 4 may, for example, be constituted by a conventional desk top dictation machine, including a desk top unit corresponding to the sound recording device 104 and a conventional hand microphone 102. To implement the present invention, a control circuit included in the desk top unit and/or in the hand microphone may be programmed or otherwise arranged to carry out some or all of the processes previously described in connection with FIGS. 2 and 3.

Details of a preferred embodiment of the sound recording system will now be described with reference to FIGS. 4 and 5. The hand microphone 102 includes an elongated housing or shell 110. In accordance with conventional practice, the housing 110 is quite thin in terms of its depth and is shaped to fit comfortably and conveniently in the user's hand. A grille region 112 in the housing 110 conceals a speaker and microphone, which are not visible in FIG. 4. Although common practice calls for providing a small speaker in the hand microphone 102, this feature may be omitted in favor of, for example, a headset connected to the sound recording device 104 or a speaker incorporated in the sound recording device itself.

Mounted on the housing 110 are control buttons or switches including a record switch 114, a rewind switch 116, a fast forward switch 118, a stop switch 120, a play switch 122, and a cue switch 124. The functions actuated by these control switches are as indicated by the names of the switches. Although not shown in the drawing, a "shift" key may also be included among the control switches.

Figure 5:
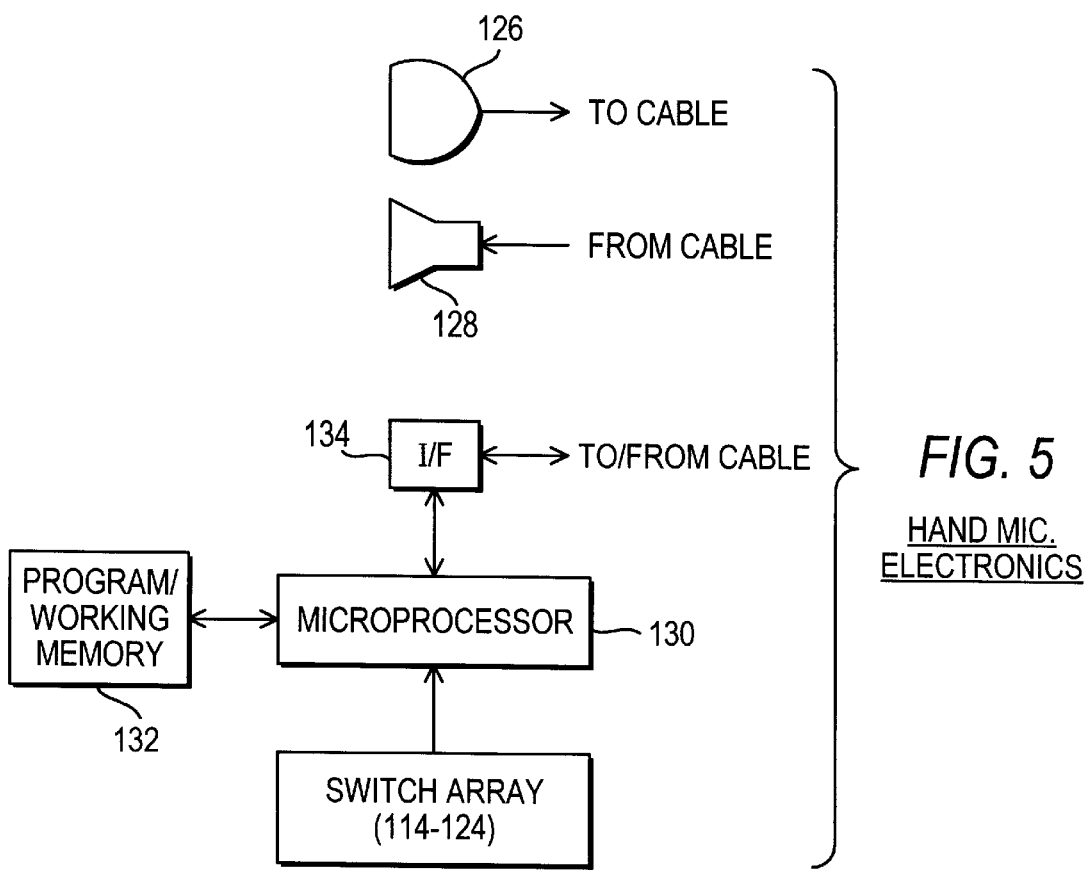
FIG. 5 is a block diagram illustration of electronic components of a hand microphone shown in FIG. 4.

Electrical and electronic components of the hand microphone 102 are schematically illustrated in FIG. 5. The electrical and electronic components include a microphone 126 connected to provide analog voice signals to the sound recording device 104 via the cable 106, and a speaker 128 for audibly reproducing voice signals received from the sound recording device 104 via the cable 106. The hand microphone 102 includes a control circuit such as a microprocessor 130 which manages the user interface provided by the hand microphone. Associated with the microprocessor 130 are conventional components such as program/working memory 132. Microprocessor 130 exchanges digital command and status signals with the sound recording device 104 by way of an interface 134 which is connected between the microprocessor 130 and the cable 106. User input signals are provided to the microprocessor 130 via the above-mentioned control switches 114 through 124. The signals provided from the switches 114–124 to the microprocessor 130 may be transmitted via a conventional cross-point switch array which is interrogated at frequent intervals by the microprocessor 130 according to conventional practice. Alternatively, the switches 114–124 may share a voltage divider which provides an analog signal that is converted by suitable interface circuitry (not shown) to a digital value which is made available to the microprocessor 130. Other techniques for interfacing the control switches to the microprocessor will be apparent to those of ordinary skill in the art.

Although not shown in FIG. 5, it is also contemplated that the hand microphone 102 may incorporate circuitry for digitizing, and possibly also compressing, the voice information input via the speaker 126. In that case, digital voice information would be transmitted over the cord 106 to the sound recording device 104. It is also to be expected in that case that the digitizing circuitry included in the hand microphone would also have a capability for converting digital signals played back from the sound recording device 104 and transmitted through the cable 106 to the hand microphone 102 so that analog signals can be provided to drive the speaker 128 in the hand microphone 102.

Referring once more to FIG. 4, major components of the sound recording device 104 will now be described. It will be noted that the cord 106 is connected to the sound recording device 104 via an interface block 140. Digital messages transmitted from the microprocessor 130 in the hand mic 102 and sent via the cable 106 to the interface 140 are provided to a control circuit 142 which controls operation of the sound recording device 104. Sound information signals transmitted from the hand microphone 102 via the cord 106 to the interface block 140 are provided to a record/playback circuit 144. The control circuit 142 controls the record/playback circuit 144 to record voice information signals on a recording medium 146 such as a tape cassette or a solid state memory card. If the recording medium is a tape cassette, it will be understood that the voice signals recorded thereon may be either analog or digital. If the recording medium is a solid state memory card, then digital recording is carried out by the record/playback circuit 144. The control circuit 142 also controls the record/playback circuit 144 to reproduce from the recording medium 146 sound information signals previously stored on the recording medium 146. The reproduced sound information signals are then transmitted to the hand mic 102 via the interface block 140 and the cord 106. The reproduced sound information signals received at the hand microphone 102 are audibly reproduced via the speaker 128.

The microprocessor 130 of the hand microphone 102 may be programmed in accordance with the principles of the invention to interpret actuation of one or more of the control switches 114–124 according to the length of time that the switch is actuated. The foregoing discussion of the processes illustrated in FIGS. 2 and 3 is applicable to the operation of microprocessor 130, and a suitable program implementing the processes of FIGS. 2 and 3 may be stored in the memory 132 of the hand microphone 102. Command messages transmitted from the microprocessor 130 to the control circuit 142 of the sound recording device 104 (via the interface 134 (FIG. 5), the cord 106 and the interface block 140 (FIG. 4)) reflect the control signals input to the microprocessor 130 by the control switches, including an interpretation of the control signals which depends on the duration of the control signals. Alternatively, the microprocessor 130 may transmit raw control signals to the control circuit 142. In that case, the control circuit 142 is programmed according to the principles of the present invention to interpret the control signals differently depending upon the duration of the control signals.

Although the present embodiment of the invention contemplates an "intelligent" hand microphone which includes a microprocessor 130 (or a micro-controller or ASIC) or the like, it is also contemplated to implement the present invention using a "dumb" hand mic which provides only analog control signals to the sound recording device 104. In this case, the control circuit 142 of the sound recording device 104 is suitably programmed to carry out some or all of the functions which were described above in connection with FIGS. 2 and 3.

It should be understood that the sound recording device 104 of FIG. 4 may be embodied by devices other than a conventional desktop recording unit. For example, the sound recording device 104 may be a conventional personal computer to which the hand mic 102 is interfaced, as in the above referenced application Ser. No. 09/099,501. As another alternative, the sound recording device 104 may be a central recording unit in a centralized dictation system. In the latter case, the connection between the hand microphone 102 and the sound recording device 104 will most likely be provided by a dial-up telephone line or a dedicated voice communication channel. In either of these two cases, the recording medium 146 may be a conventional computer hard-disk drive, and/or a computer floppy disk.

Figure 6:
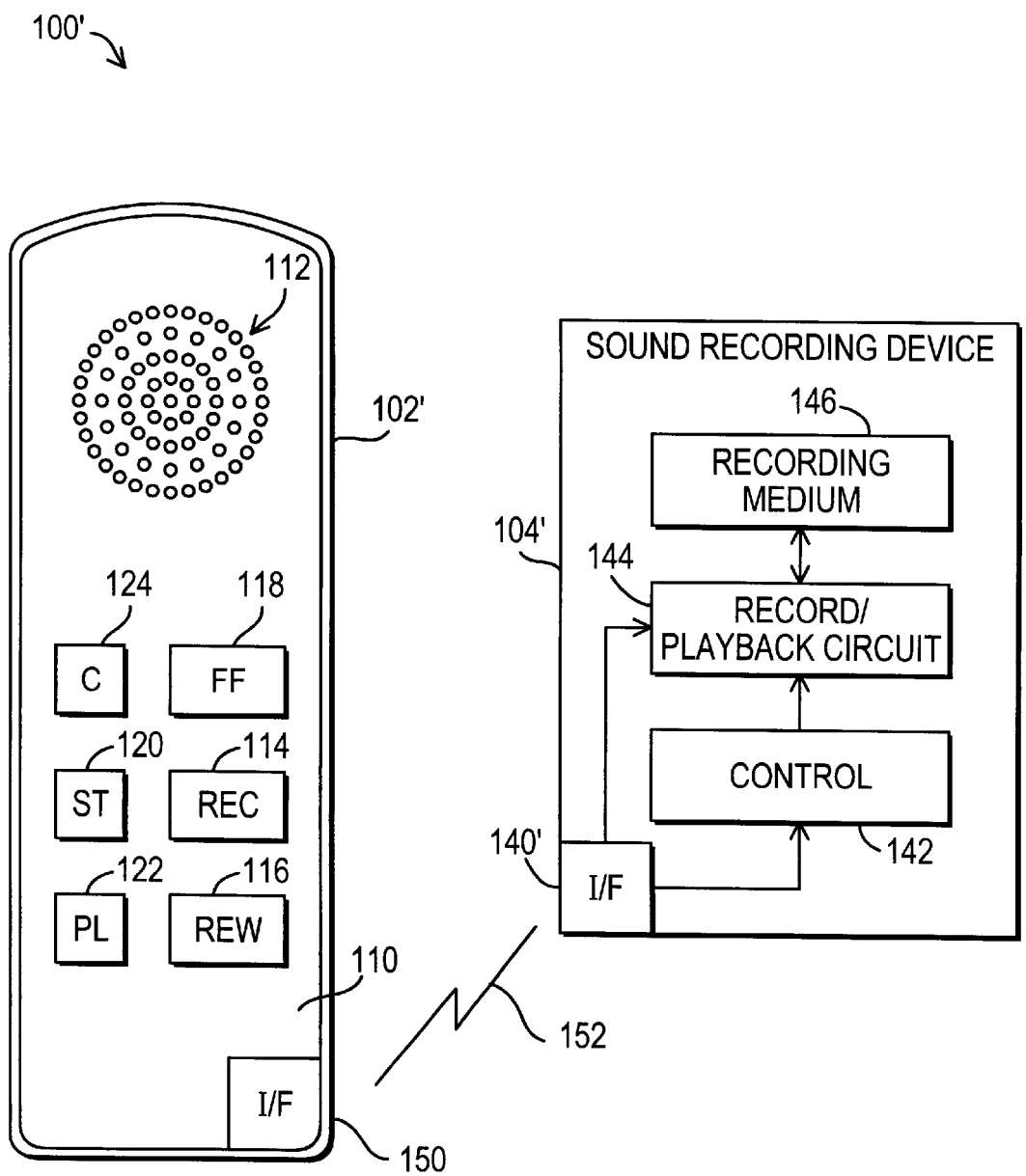
FIG. 6 shows an alternative embodiment of the sound recording system of FIG. 4.

It should also be understood that the cable connection 106 shown in FIG. 4 may be replaced with a wireless communication link 152, as shown in FIG. 6. If wireless communication is implemented, the interface block 140' of the sound recording device 104' would be such as to provide for wireless communication. At the same time, a suitable wireless communication interface 150 would be included in the hand microphone 102'. Wireless communication techniques which include infra-red signalling or radio frequency signalling may be employed.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A sound recording system, comprising:

a hand microphone;

a plurality of operating switches mounted on said hand microphone, said plurality of operating switches including a record switch;

a sound recording device for recording sound information generated at said hand microphone;

means for providing a signal path between said hand microphone and said sound recording device; and control means for controlling operation of said sound recording device;

wherein said control means places said sound recording device in a record-lock mode when the record switch is actuated for less than a predetermined period of time, and said control means places said sound recording device in a momentary-record mode when the record switch is actuated for more than a predetermined period of time;

wherein, in said record-lock mode, recording continues with the record switch in an unactuated condition, and said momentary-record mode is entered upon actuation of the record switch in said record-lock mode; and wherein, in said momentary-record mode, recording continues so long as the record switch remains in an actuated condition and recording ceases when the record switch ceases to be actuated.

2. A sound recording system according to claim 1, wherein said sound recording device includes a solid state memory in which said sound information is recorded.

3. A sound recording system according to claim 2, wherein said solid state memory comprises a removable solid state memory card.

4. A sound recording system according to claim 1, wherein said means for providing a signal path includes a cable interconnecting said hand microphone and said sound recording device.

5. A sound recording system according to claim 1, wherein said means for providing a signal path includes means for providing wireless communication between said hand microphone and said sound recording device.

6. A method of operating a sound recording device, comprising the steps of:

entering a record-lock mode of operation if a record switch is actuated for less than a predetermined period of time; and entering a momentary-record mode of operation if the record switch is actuated for more than the predetermined period of time;

wherein, in said record-lock mode of operation, recording continues with the record switch in an unactuated condition, and said momentary-record mode of operation is entered upon actuation of the record switch in said recordlock mode of operation; and wherein, in said momentary-record mode of operation, recording continues so long as the record switch remains in an actuated condition and recording ceases when the record switch ceases to be actuated.

7. A method of providing rewind functions in a sound recording device, comprising the steps of:

entering a latched rewind mode of operation if a rewind key is actuated for less than a predetermined period of time;

entering a momentary rewind mode of operation if the rewind key is actuated for more than the predetermined period of time; and rewinding to a beginning point of a currently accessed file if the rewind key is operated in combination with a shift key.

8. A method according to claim 7, wherein a rate at which rewinding is performed is accelerated in said momentary rewind mode as said momentary rewind mode continues.

9. A method of providing fast-forward functions in a sound recording device, comprising the steps of:

entering a latched fast-forward mode of operation if a fast-forward key is actuated for less than a predetermined period of time;

entering a momentary fast-forward mode of operation if the fast-forward key is actuated for more than the predetermined period of time; and advancing to an end point of a currently accessed file if the fast-forward key is operated in combination with a shift key.

10. A method according to claim 9, wherein a rate at which the fast-forward function is performed is accelerated in said momentary fast-forward mode as said momentary fast-forward mode continues.

* * * * *